US008117208B2

(12) United States Patent
Chang et al.

(10) Patent No.: US 8,117,208 B2
(45) Date of Patent: Feb. 14, 2012

(54) SYSTEM FOR ENTITY SEARCH AND A METHOD FOR ENTITY SCORING IN A LINKED DOCUMENT DATABASE

(75) Inventors: Kevin Chen-Chuan Chang, Champaign, IL (US); Tao Cheng, Urbana, IL (US); Xifeng Yan, Montrose, NY (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 611 days.

(21) Appl. No.: 12/233,812

(22) Filed: Sep. 19, 2008

(65) Prior Publication Data

US 2009/0083262 A1 Mar. 26, 2009

Related U.S. Application Data

(60) Provisional application No. 60/974,208, filed on Sep. 21, 2007.

(51) Int. Cl.
*G06F 7/00* (2006.01)
*G06F 17/30* (2006.01)
(52) U.S. Cl. ....................................... 707/748
(58) Field of Classification Search .............. 707/748, 707/999.005
See application file for complete search history.

(56) References Cited

U.S. PATENT DOCUMENTS

| | | | | |
|---|---|---|---|---|
| 2004/0230572 | A1* | 11/2004 | Omoigui | 707/3 |
| 2005/0262050 | A1 | 11/2005 | Fagin et al. | |
| 2008/0306908 | A1* | 12/2008 | Agrawal et al. | 707/3 |

OTHER PUBLICATIONS

Cheng, Tao, et al., "Entity Search Engine: Towards Agile Best-Effort Information Integration over the Web", Conference/Innovative Data Systems Research, Jan. 2007;108-113.
Brin, Sergey, et al.; "The Anatomy of a large-scale hypertexual Web search engine"; Computer Networks and ISDN Systems 30 1998; 107-117.
Cafarella, Michael J., et al.; "A Search Engine for Natural Language Applications"; Dept. of Computer Science & Engineering, Univ. of Washington;WWW 2005, May 10-May 14, 2005;442-452.
Cafarella, Michael J., et al.; "Structured Querying of Web Text A Technical Challenge";3rd Biennial Conference on Innovative Data Systems Research (CIDR),Jan. 7-Jan. 10, 2007;225-234.
Chakrabarti, Kaushik, et al.; "Ranking Objects by Exploiting Relationships: Computing Top-K over Aggregation"; SIGMOD 2006, Jun. 27-29, 2006, Chicago, IL; 371-382.

(Continued)

*Primary Examiner* — John R. Cottingham
*Assistant Examiner* — Nicholas Allen
(74) *Attorney, Agent, or Firm* — Duane Morris LLP (57) ABSTRACT

A system has a processor coupled to access a document database that indexes keywords and instances of entities having entity types in a plurality of documents. The processor is programmed to receive an input query including one or more keywords and one or more entity types, and search the database for documents having the keywords and entities with the entity types of the input query. The processor is programmed for aggregating a respective score for each of a plurality of entity tuples across the plurality of documents. The aggregated scores are normalized. Each respective normalized score provides a ranking of a respective entity tuple, relative to other entity tuples, as an answer to the input query. The processor has an interface to a storage or display device or network for outputting a list including a subset of the entity tuples having the highest normalized scores among the plurality of entity tuples.

47 Claims, 7 Drawing Sheets

OTHER PUBLICATIONS

Chakrabarti, Soumen, et al.; "Optimizing Scoring Functions and Indexes for Proximity Search in Type-annotated Corpora"; WWW 2006, May 23-26, 2006, Edinburgh, Scotland; 717-726.

Cheng, Tao; "Entity Search Engine: Towards Agile Best-Effort Information Integration over the Web"; 3rd Conference on Innovative Data Systems Research (CIDR) Jan. 2007;108-113.

Cheng, Tao, et al.; "Supporting Entity Search: A Large-Scale Prototype Search Engine"; SIGMOD 2007, Jun. 11-14, 2007, Beijing, China; 1144-1146.

Cheng, Tao, et al.; "EntityRank: Searching Entities Directly and Holisitically"; 33rd Very Large Data Bases Conference (VLDB) 2007, Sep. 23-27, 2007, Austria; 387-398.

Kandogan, Eser, et al.; "Avatar Semantic Search: A Database Approach to Information Retrieval"; SIGMOD 2006, Jun. 27-29, 2006, Chicago, IL; 790-792.

Nie, Zaiqing, et al.; "Web Object Retrieval"; WWW 2007, May 8-12, 2007, Track: Data Mining, Session: Identifying Structure in Web Pages, Banff, Alberta, Canada; 81-89.

Chang, Kevin C., et al.; "Finding Stuff on the Web: Directly and Holistically"; Web Indexing and Search for Data Mining (WISDM) 2006; 1-44.

* cited by examiner

| rank | phone number | score | urls |
|---|---|---|---|
| 1 | 800-201-7575 | 0.9 | amazon.com/support.htm<br>myblog.org/shopping |
| 2 | 800-988-0886 | 0.8 | Dell.com/supporters |
| 3 | 800-342-5283 | 0.6 | xyz.com |
| 4 | 206-346-2992 | 0.2 | hp.com |
| ... | ... | ... | ... |

FIG. 8

SYSTEM FOR ENTITY SEARCH AND A METHOD FOR ENTITY SCORING IN A LINKED DOCUMENT DATABASE

This application claims the benefit of U.S. Provisional Patent Application 60/974,208, filed Sep. 21, 2007, which application is incorporated by reference herein as though set forth herein it its entirety.

FIELD OF THE INVENTION

The present disclosure relates to methods and systems for querying a database of documents or files.

BACKGROUND OF THE INVENTION

As an information repository, the immense scale and wide spread use of the World Wide Web has made it not only a source where information is found, but also a destination where information is published. These dual forces have enriched the Web with all kinds of data, much beyond the conventional page view of the Web as a corpus of HTML pages, or "documents." Consequently, the Web is now a rich collection of data-rich pages, on the "surface Web" of static URLs (e.g., personal or company homepages) as well as the "deep Web" of database-backed contents (e.g., flights from aa.com).

While data are proliferating, however, the ability of current search tools to effectively access such data (e.g. finding the customer service number of Amazon) using traditional document retrieval techniques is limited. Often times, it is difficult to formulate the right keywords for hitting promising documents. Furthermore, one has to sift through the returned documents one by one to identify the desired data.

Conventional search engines typically use keyword searching to find relevant documents or pages. The documents may be ranked according to a calculated estimate of relevance. Such conventional techniques are optimized towards finding relevant documents of the keywords, and not towards directly finding data as answers to specific questions). Given the documents returned by conventional search engines, a user has to sift through the documents one by one to look for the specific answer. Moreover, while the high ranked documents may specifically address topics about which the user is interested in and have all the keywords used in the query, they may not contain information or only contain irrelevant or inaccurate information with regard to the specific datum the user wants. The specific datum or answer the user is looking for may appear in many lower ranked documents instead. Depending on the relative rankings of these pages, the user inputting the query may have to sift through many pages before finding the correct datum or may never visit the low rank documents, and thus miss the sources having the information he or she actually is seeking.

Chakabarti et al., "Ranking Objects by Exploiting Relationships: Computing Top-K over Aggregation," SIGMOD 2006, June 2006, describes an "Object Finder" that views an "object" as the collection of documents that are related with it and therefore scores an "object" by performing aggregation over document scores. The relevance score of an object is an aggregate of the full text search scores (i.e., the keyword match scores returned by full text search) of all related documents containing the query keywords.

A more effective mechanism is desired to search over data or entities on the Web or other database of documents or pages.

SUMMARY OF THE INVENTION

In some embodiments, a method comprises receiving an input query, including one or more keywords and one or more entity types. A database is provided that indexes keywords and instances of entities having entity types in a collection of documents. The database is searched for documents having the keywords and entities with the entity types of the input query. A respective score is aggregated for each of a plurality of entity tuples across the plurality of documents. The aggregated scores are normalized. Each respective normalized score provides a ranking of a respective entity tuple, relative to other entity tuples, as an answer to the input query. A list is output, including a subset of the entity tuples having the highest normalized scores among the plurality of entity tuples, to a storage or display device or a network.

In some embodiments, a method comprises searching for qualifying occurrences of at least one entity and at least one keyword from a database of linked documents. Entity tuples are identified from the qualifying occurrences of the entity and keyword. For each instance of entity tuple in one of the documents, a local score is assigned based on a context of the entity in that document and an uncertainty value associated with extraction of the entity from that document. For each distinct entity tuple, all the local scores thereof are aggregated into a global score across the documents, based on respective weight assigned to each respective document. The global scores are normalized. A relatively ranked listing of the normalized scores of at least a subset of the distinct entity tuples is output to a storage or display device.

In some embodiments, a system comprises at least one processor. The at least one processor is coupled to access a document database that indexes a plurality of documents for keywords and instances of entities having entity types in a plurality of documents. The at least one processor is configured to receive an input query including one or more keywords and one or more entity types, and search the database for documents having the keywords and entities with the entity types of the input query. The at least one processor is configured for aggregating a respective score for each of a plurality of entity tuples across the plurality of documents. The aggregated scores are normalized. Each respective normalized score provides a ranking of a respective entity tuple, relative to other entity tuples, as an answer to the input query. The at least one processor has an interface to a storage or display device or network for outputting a list, including a subset of the entity tuples having the highest normalized scores among the plurality of entity tuples.

In some embodiments, a machine readable storage medium is encoded with computer program code, wherein when the computer program code is executed by a processor, the processor performs a method comprising receiving an input query, including one or more keywords and one or more entity types. A database is provided that indexes keywords and instances of entities having entity types in a collection of documents. The database is searched for documents having the keywords and entities with the entity types of the input query. A respective score is aggregated for each of a plurality of entity tuples across the plurality of documents. The aggregated scores are normalized. Each respective normalized score provides a ranking of a respective entity tuple, relative to other entity tuples, as an answer to the input query. A list is output, including a subset of the entity tuples having the highest normalized scores among the plurality of entity tuples, to a storage or display device or a network.

DETAILED DESCRIPTION OF THE INVENTION

This disclosure describes a system and method that is able to search directly and holistically for finding various data "entities" from a database of documents. In some embodiments, the database indexes a collection of linked documents, such as documents containing hyperlinks. One example uses the Worldwide Web as a collection of linked documents. In some embodiments, the document collection may include locally stored documents, remotely stored documents accessible via a network, or any combination of the two. In some embodiments, the document collection may include linked documents, documents without hyperlinks, or any combination of the two.

As defined herein, an entity is a datum of a given entity type such as, but not limited to, a phone number, a name, an address, or a date. In the examples below, entities are included within files or documents in a document collection. In an exemplary method and system described herein, the response to a query includes one or more entity tuples ((where each tuple is a combination including a respective data entity from each of the requested entity types, for example, phone numbers, names, and the like)) that are expected to be the best answer(s) to the query, given the extracted information available from the various documents. In some embodiments, a plurality of entity tuples are identified as answers to the query, ranked by an estimated probability that each is the best answer set, given the extracted information available from the various documents. Thus, the output of an entity search is a set of data (answers extracted from the documents), in contrast to a document search that provides a mere listing of documents expected to contain relevant data.

In this description, the notation "#xxxxx" indicates the entity type xxxxx. For example, #phone indicates the entity type "phone number," and #email indicates the entity type "email address." One example of a query q seeking a phone number may be q=(phone, #phone), where "phone" is the keyword, and #phone is an entity type. This query would be directed towards occurrences of the keyword "phone" in proximity to an integer having a format used for telephone numbers (e.g., 10 digits). The present method evaluates whether the 10 digit number proximate to the keyword "phone" within a document should be considered an occurrence of an entity having the entity type "#phone".

Figure 1:
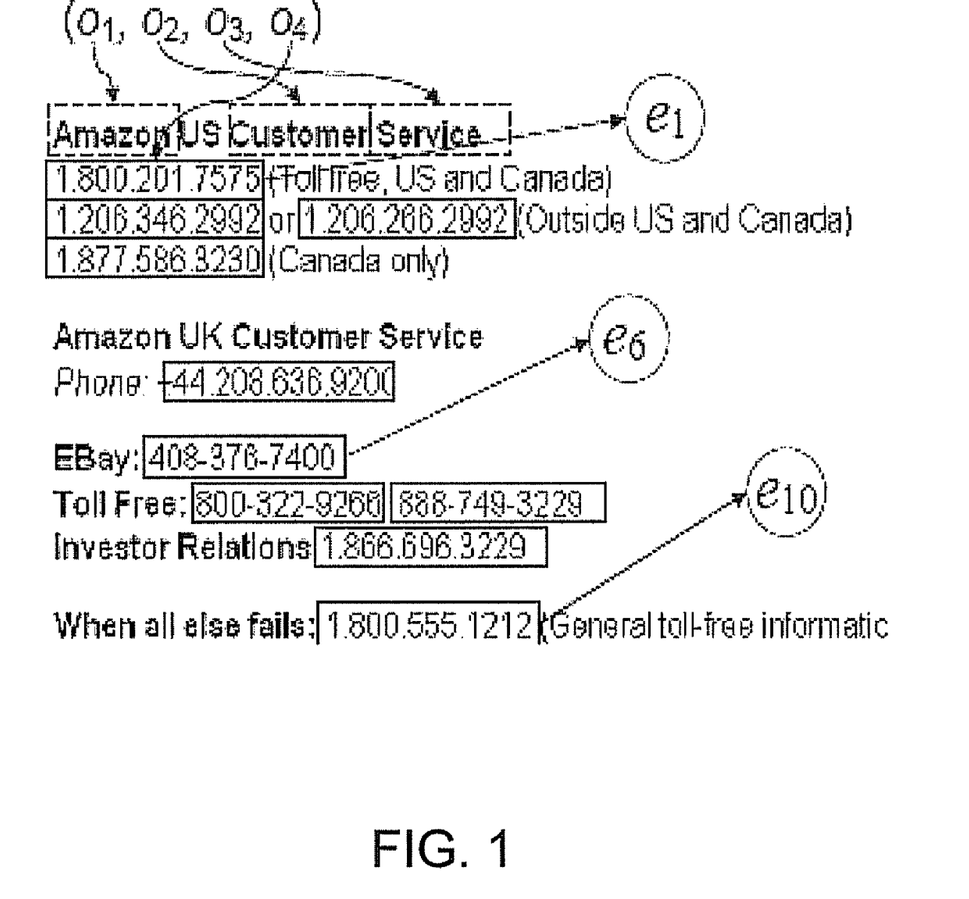
FIG. 1 is a diagram of a Web page, showing the entity search problem.

FIG. 1 is a diagram of one example of a web page or document presenting the entity ranking problem. In this example, the user wishes to find a phone number for Amazon customer service. A query for seeking this information might be (Amazon customer service, #phone). During the extraction process, the document is identified as having the keywords "Amazon" and "customer service", and several objects that appear to be of the entity type #phone (i.e., 10 digit numbers, or 11 digit numbers beginning with 1). As is apparent from reviewing the page, these objects are indeed phone numbers, but most of them are not associated with Amazon customer service. There may be many other pages that also include the keywords and objects that appear to be of the entity type #phone. The ranking problem becomes one of identifying which of the numbers among all of the documents are most likely to be the desired Amazon customer service number, taking into account the contextual information available from each individual document, as well as discriminative features that allow the method and system to give some documents greater weight than others.

In response to a query including one or more keywords and one or more entity types, the system and method provide a plurality of entity tuples. An entity tuple includes a combination of a respective entity for each respective entity type in the query. The system and method output a list of the entity tuples with the highest scores. In some embodiments, the list of entity tuples is ranked in descending order, each entity tuple providing a respective combination of one entity for each entity type in the query. The entity tuples in the ranked list are ranked by the estimated probability that each entity tuple represents the "best" set of answers to the query, based on the information extracted from the document collection.

Embodiments are described herein to provide global aggregation and validation methods for robust and effective ranking among documents in addition to local analysis of individual documents. In some embodiments, a flexible query primitive allows expressive patterns and multiple entities in one query;

Examples of systems and methods are described below, providing an effective and efficient entity-aware search framework, with a principled underlying ranking model, to better support many possible search and mining applications. For instance, the described system can be used as an underlying search engine to support question answering (QA) applications; or, the described method can be incorporated into a QA application to generate ranked entity tuples as candidate answers to further process for the final answer. This description includes combining local analysis, global aggregation and result verification in a principled way, and is suitable for use with a variety of documents, including documents stored over a network and/or documents of varying quality.

First, IE techniques are used to extract entities. In some embodiments, information extraction is performed offline, before any of the queries are received by the system. The extracted information is stored in a database index, which may be an inverted index. The extraction may be performed by a module of the system, or by another party separate from the operator of the system described herein. In either case, the system is provided access to the index for searching the keyword and entity information stored therein.

In other embodiments, the system provides online relation extraction based on association. An example of a system described below discovers the meaningful association of entities holistically over the whole collection of documents. That is, given an input query and a whole collection of documents, the system and method provide an output that is expected to be a best answer to the query, as determined from analysis of those documents.

Second, the disclosed system can be used as a core component to support QA more directly and efficiently. Unlike most QA works, which identify and retrieve relevant documents first and then attempt to extract answers from those documents which have already been identified as relevant, a method is described herein to directly build the concept of entity into the search framework.

Figure 6:
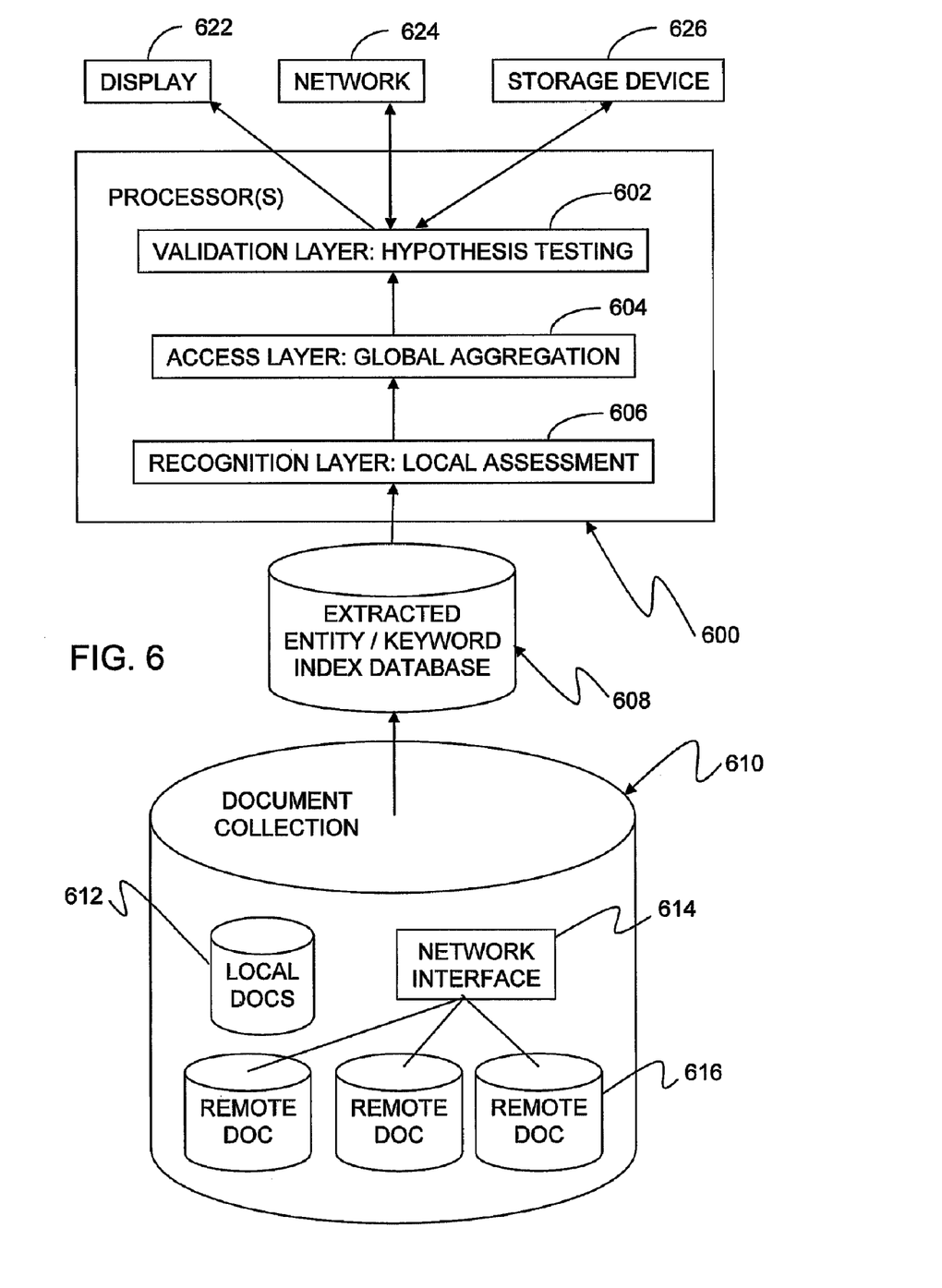
FIG. 6 is a block diagram of a system according to one embodiment.

FIG. 6 is a block diagram of an exemplary search system 600. In some embodiments, the system 600 is an application executed on a general purpose processor. In other embodiments, various functions of the system 600 are executed by respectively different processors. The recognition, access and validation layers 606, 604 and 602 may each be hosted in a respective processor. Although FIG. 6 specifically shows three layers or modules 602, 604, 606 included in system 600, the functions performed by these layers or modules in the example below may be divided among a plurality of modules, which may be executed in any configuration of one or more processors to provide a desired level of performance. Further, one or more of the functions of one or more of the modules 602, 604, 606 may be performed by a digital signal processor comprising special purpose hardware (application specific integrated circuitry) for performing the functions and/or steps described herein.

The system 600 queries a document index database 608, that indexes a document collection 610. In some embodiments, the document collection 610 is a distributed database such as the collection of remotely stored documents 616, accessible by any network, schematically represented by network interface 614. The network interface 614 may be connected to a local area network (LAN), a wide area network (WAN), and/or to the Internet for accessing documents and pages on the Worldwide Web. The document collection 610 may include a repository of locally stored documents 612. In some embodiments, the document collection 610 includes both remotely stored documents on the network (e.g., Internet) and locally stored documents 612.

Figure 7:
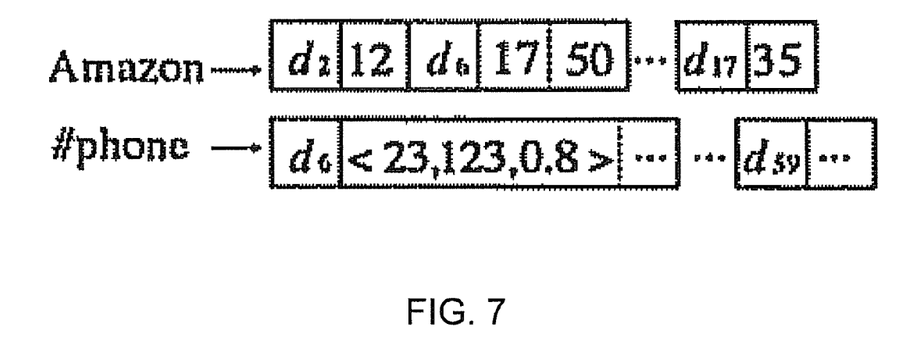
FIG. 7 is a diagram of exemplary entries in the index database shown in FIG. 6.

An extracted entity/keyword index database 608 is provided. To enhance query handling performance, extraction is performed offline. A document collection D is crawled from the database (e.g., the Web) and transformed into an entity collection E with entities $\{E_1, E_2, \ldots, E_n\}$. For example, to support entity search entities may be indexed in a manner similar to indexing of keywords. FIG. 7 shows one example of two records from an index, for the keyword, "Amazon" and for the entity #phone representing a phone number. An inverted index technique may be used for indexing the keywords, such that given a keyword $k_j$, its corresponding inverted list includes all occurrences in the collection ordered by document number. Extracted entities may be indexed in a similar fashion.

To index an entity type $E_i$, a list is provided containing all the pertinent information regarding the extracted instances of $E_i$. Specifically, the list records for each occurrence of entity instance $e_i$, the position $e_i.pos$ of the extraction in the documents. For example, in FIG. 7, position 23 at document d6, the entity instance ID $e_i.id$, e.g., ID 123 for representing phone number "805-213-4545", and the confidence of extraction $e_i.conf$, e.g., 0.8. All occurrence information of entity instances of certain entity types are stored in an ordered list as shown in FIG. 7. The confidence of extraction $e_i.conf$ may take into account both entity recognition issues related to determination of whether a datum having an appropriate format and position for the entity is actually an occurrence of the entity, and character recognition issues for optical character recognition of documents stored in image format. In some embodiments, the extracted entity/keyword index 608 is co-located with the processor(s) hosting system 600. In other embodiments, the index 608 is available to the system 600 by way of a network (e.g., LAN, WAN or the Internet).

The system 600 includes three layers, modules or functions: recognition layer 606 for performing local assessment and outputting local entity tuple scores; access layer 604 for performing global aggregation of entity tuple scores; and validation layer 602 for hypothesis testing, validating and normalizing the global aggregated scores.

The recognition layer 606 performs local assessment for an individual document by identifying each candidate an entity tuple occurrence (including the keywords and an entity having each entity type in the query) within that document. Recognition layer 606 evaluates each candidate entity tuple for compliance with any specified matching pattern, and provides a quantitative local score, so as to determine whether occurrences of entities having all the query entity types in the same document are associated to provide a desired tuple to answer the query. In some embodiments, the quantitative local score is provided using fuzzy probabilistic analysis, but alternative scoring methods may be used.

The access layer 604 aggregates the local scores for a given entity tuple across all of the documents containing that entity tuple to provide a global aggregate score. Access layer 604 applies one or more discriminative factors that are indicative of the quality of each document as a source of information (i.e., the reliability of the document as a source of accurate information). Exemplary indicators of quality may include document popularity (e.g., number of page visits), authoritativeness (e.g., PageRank), editorial rating, tagging, or bookmarking.

The validation layer 602 normalizes the aggregated scores using global statistics, to output a probability that the associations found by the recognition layer 606 and access layer 604 are not due to random occurrences of the keywords and objects in the document collection. This normalization allows ranking of all the candidate entity tuples relative to each other. The validation layer 602 then outputs a ranked list of the highest scoring subset of the entity tuples. The output may be transmitted to a display 622, a network 624, or a storage device 626.

In some instances, the various documents may include inconsistent or conflicting values for one or more of the entities, and the entities may not be extracted correctly from each document. The exemplary method views an entity tuple as all its occurrences over the collection. Therefore, its score is aggregated over all its occurrences in multiple documents, taking into consideration uncertain, contextual factors other than the individual document score.

One embodiment of a method comprises: accepting as input one or more keyword terms and one or more entity types, optionally with a pattern; and returning as output a ranked list of entity tuples, in descending order of the score of the entity tuples.

Also described is a method for ranking entities, by distilling its underlying conceptual model (referred to below as the "Impression Model") and using a probabilistic ranking framework, EntityRank, that is able to seamlessly integrate both local and global information in ranking. This ranking method captures the relevant characteristics of the specific entity search problem being addressed.

Figure 2:
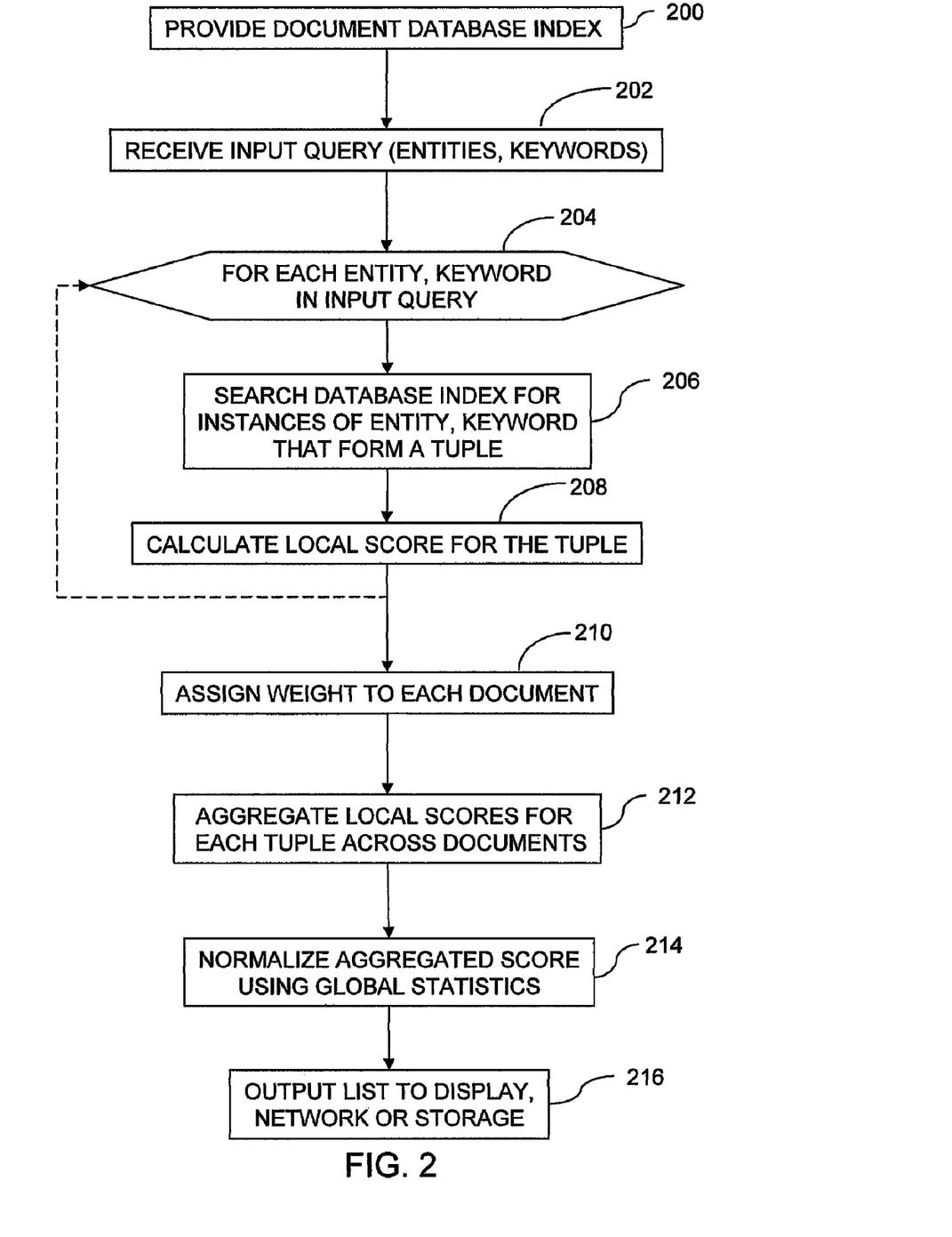
FIG. 2 is a flow chart of a method for providing a ranked response to a query of a database that indexes keywords and entities extracted from a collection of documents.

FIG. 2 is a flow chart diagram of one example of a method of querying a database using the system 600 of FIG. 6.

At step 200, the document database index 608 is provided, including the keyword and entities from the document collection 610.

At step 202, an input query is received. The input query includes at least one keyword and at least one entity type. The input query may include a plurality of keywords and may include a plurality of entity types. The input query may also include a matching criterion used by the system 600 to determine whether occurrences in the same document of the keywords and entities having the entity types qualify as instances of entity tuples.

At step 204, a loop is performed for each entity type and keyword in the input query.

At step 206, the database index 608 is searched for instances of the keywords and entities having the query entity types that form entity tuples.

At step 208, the recognition layer 606 calculates a local score for the tuple, thus identifying the qualifying entity occurrences from the document collection 610 to form candidate entity tuples. For each of the matched instances (satisfying the matching pattern in the query) in a document, a local score is assigned based on contextual features and accounting for potentially uncertain features.

At step 210, a weight is assigned to each document, according to a selected discriminating feature, such as document popularity or the like.

At step 212, for each distinct entity tuple, all its local scores are aggregated holistically into a global score based on the discriminative features of the containing documents where the entity tuple was found.

At step 214, the global scores are normalized based on the associative features of each entity tuple, which are global statistics that indicate the association of the keywords and entities, to output the final score for each entity tuple, to output the final score of each entity tuple.

At step 216, the list of the entity tuples having the highest normalized scores are output to a tangible medium, such as a display, machine readable storage medium, or to a network. Preferably the output tuples are listed in descending order.

In the standard page view, the Web (or any document collection) is a set of documents (or pages) $D=\{d_1, \ldots, d_n\}$. The present data model takes an entity view: The Web is considered as primarily a repository of entities (in addition to the notions of pages): $E=\{E_1, E_2, \ldots, E_n\}$, where each $E_i$ is an entity type. For instance, the system might be constructed with entities $E=\{E_1: \#phone, E_2: \#email\}$. Further, each entity type $E_i$ is a set of entity instances that are extracted from the corpus, i.e., literal values of entity type $E_i$ that occur somewhere in some $d \in D$. The term $e_i$ denotes an entity instance of entity type $E_i$. In the example of phone number patterns, we may extract $\#phone=\{\text{``800-201-7575''}, \text{``244-2919''}, \text{``(217) 344-9788''}, \ldots\}$. Thus, the query and response can be sated as follows:

| Given: | Entity collection $\mathcal{E}=\{E_1, \ldots, E_N\}$ over Document collection $D=\{d_1, \ldots, d_n\}$ |
|---|---|
| Input: | Query q ($<E_1, \ldots, E_m>$)=$\alpha(E_1, \ldots, E_m, k_1, \ldots, k_l)$, where $\alpha$ is a tuple pattern, $E_i \in \epsilon$, and $k_j$ a keyword |
| Output: | Ranked list of $t=<e_1, \ldots, e_m>$, where $e_i \in E_i$, sorted by Score(q(t)), the query score of t. |

First, for input, as queries, the entity search system and method lets users search for entities by specifying target entity types and keywords together in a tuple pattern $\alpha$, which indicates the users' intention of what the desired entities are, and how they may appear in D by certain patterns. Entity search is essentially search by context over the document collection: As $\alpha$ intends to capture, the desired data often appear in some context patterns with other keywords or entities, indicating how they together combine into a desired tuple by their textual occurrences. A system will support, as its implementation decisions, a set of such patterns, e.g., doc (the same document), ow (ordered window), uw (unordered window), and phrase (exact matching). A query can either explicitly specify a pattern or implicitly assume the system default pattern. A variety of default patterns may be used, such as, for example, a default requirement that the entities and keywords are appear within the same document in any order, with no limit on proximity, or within 200 words of each other.

Second, for output, the results are a ranked list of m-ary entity tuples, each of the form $t=<e_1, \ldots, e_m>$, i.e., a combined instance of each $e_i$ as an instance of entity $E_i$ desired in the query. A result tuple t will be ranked higher, if it matches the query better. This measure of how well t matches q is denoted by a query score Score(q(t)), which should capture how t appears, by the desired tuple pattern $\alpha$, across every document $d_j$ in D, i.e., $$\text{Score}(q(t))=\text{Score}(\alpha(e_1, \ldots, e_m, k_1, \ldots, k_l)).$$

Impression Model

To begin with, assuming no resource or time constraints, consider an ideal realization of entity search, over the Web (or, in general, any document collection) as D. For example, consider query Q1 for finding tuple <"amazon customer service",#phone>. As many users would probably do, one can access "amazon"-related pages (say, from a search engine), browse their contents, and follow links to read more, until satisfied (or until the user gives up), and returning overall findings of promising #phone numbers.

Some embodiments include a tangible implementation of a conceptual model referred to herein as the "Impression Model". The impression model assumes an observer with unlimited time and resources, to repeatedly access the documentation collection D and collect all available evidence for substantiating any potential answer. This observer will visit as many documents and for as many times as he wishes. He will examine each such document d for any #phone that matches Q1 (i.e., following and near "amazon customer service") and form his judgment of how good the matches are. With an unlimited memory, he will remember all his judgments—i.e., his impression. The observer will stop when he has sufficient impressions, according to which he will score and rank each phone entity instance that occurs in D.

To formalize this impression model, a probabilistic view is used to capture the observer's "impression." For a query q, given entity collection E over document collection D, the impression framework is as described below. To execute entity search, at time $\tau$, the observer accesses a document, denoted $d^\tau$, from D— This mechanism is modeled as the access layer of the observer. Examining this $d^\tau$, he will recognize if any potential tuple t occurs there. This assessment function is modeled as the observer's recognition layer. Formally, this assessment results in the association probability $p(q(t)|d^\tau)$—i.e., how likely tuple q(t) holds true given the "evidence" of $d^\tau$, The observer's impression model (below) provides a method for execution of entity search.

Given: $\epsilon=\{E_1, \ldots, E_N\}$ over $D=\{d_1, \ldots, d_n\}$, Let $E=E_1 \times \ldots \times E_m$ Input: $q=\alpha(E_1, \ldots, E_m, k_1, \ldots, k_l)$, 0: $\tau=1$; /* timetick 1: while ($\tau=\tau+1$ and $\tau \leq T$):

2: $d^\tau$=access document from D; /* access layer.

3: $\forall t \in E$: Score$(q(t)|d^T)$=recognize $p(q(t)|d^T)$; /* recognition layer 4: $\forall t \in E$ output Score$(q(t)) = \dfrac{\sum_{\tau=1}^{T} \text{Score}(q(t)|d^T)}{T}$;

/*average impression

Eventually, at some time τ=T, the observer may have sufficient "trials" of this repeated document visits, at which point his impression stabilizes (i.e., with sufficient sampling from D). To capture this convergence statistically, the exemplary system characterize the access layer by p(d), the access probability of document d, i.e., how likely d may be drawn in each trial. Thus, over T trials, d will appear T×p(d) times. If T is sufficiently large, the average impression (i.e., statistical mean) will converge—which is similarly referred to herein as the association probability of q(t) over D:

$$p(q(t)|D) = \lim_{T\to\infty} \dfrac{\sum_{\tau=1}^{T} p(q(t)|d^T)}{T} = \sum_{d \in D} p(d) \cdot p(q(t)|d) \qquad (1)$$

As this association probability characterizes how likely t forms a tuple matching q(t), when given the entire collection D as evidence, it provides the "query score". In some embodiments, an additional hypothesis testing operation is performed. In other embodiments, this association probability is the final query score, i.e., Score$(q(t))=p(q(t)|D)$.

Recognition Layer

Given a document d, the system is able to assess how a particular tuple t=<e1, ..., $e_m$> matches the query q(<$E_1$, ..., $E_m$>)=α($E_1$, ..., $E_m$, $k_1$, ..., $k_j$). That is, this layer is to determine p(q(t)|d), i.e., how likely tuple q(t), in the form of α($e_1$, ..., $e_m$, $k_1$, ..., $k_j$), holds true, given d as evidence. Consider Q1: Given d as the excerpt in FIG. 1, for t=<$e_1$="800-201-7575">, the question becomes: p(Q1(t)|d)=p(ow(Amazon customer service $e_1$)|d)=?

To begin with, a query tuple q(t)=α($e_1$, ..., $e_m$, $k_1$, ..., $k_j$) may appear in d in multiple occurrences, because each $e_i$ or $k_j$ can appear multiple times. For instance, in FIG. 1, while $e_1$="800-201-7575" occurs only once, "Amazon customer service" appears two times—so they combine into two occurrences. Let's denote such an occurrence of ($e_1$, ..., $e_m$, $k_1$, ..., $k_j$) in document d as γ=($o_1$, ..., $o_n$), where n=m+1; each $o_i$ is an object occurrence, i.e., a specific occurrence of entity instance $e_i$ or keyword instance $k_j$ in d. E.g., FIG. 1 shows ($o_1$, ..., $o_4$) as one occurrence for the above example.

For each potential tuple t, the recognition of the association probability p(q(t)|d) must evaluate all its occurrences, and "aggregate" their probabilities—because each one contributes to supporting t as a desired tuple. For this aggregation, the maximum across all occurrences of t is taken as its overall probability, i.e., $$p(q(t)|d) = \max_{\gamma \text{ is a tuple occurence of } q(t)} p(\alpha(\gamma)) \qquad (2)$$

With this aggregation in place, each occurrence γ={$o_1$, ..., $o_n$} for p(α(γ)) is assessed—i.e., the system evaluates how this tuple occurrence matches the desired context pattern. This task involves two largely orthogonal considerations:

Extraction uncertainty: For each occurrence oi that represents an entity instance ei—Is it indeed an instance of entity type $E_i$? After performing extraction on D to prepare the "entity view" E, this probability p($e_j \in E_j$|d) is recoded in $e_i$.conf.

Association context: Do the occurrences of $o_1$, ..., $o_n$ together match the pattern α that suggests their association as a desired tuple for query q?

With the two orthogonal factors, given $e_i$.conf, one of ordinary skill can readily factor out the extraction uncertainty, and focus on the remaining issue: defining $p_{context}$—i.e., how t matches q in the context of d.

$$p(\alpha(\gamma)) = \left(\prod_{e_i \in \gamma} e_i \cdot conf\right) \times p_{context}(\alpha(\gamma))$$

Figure 3:
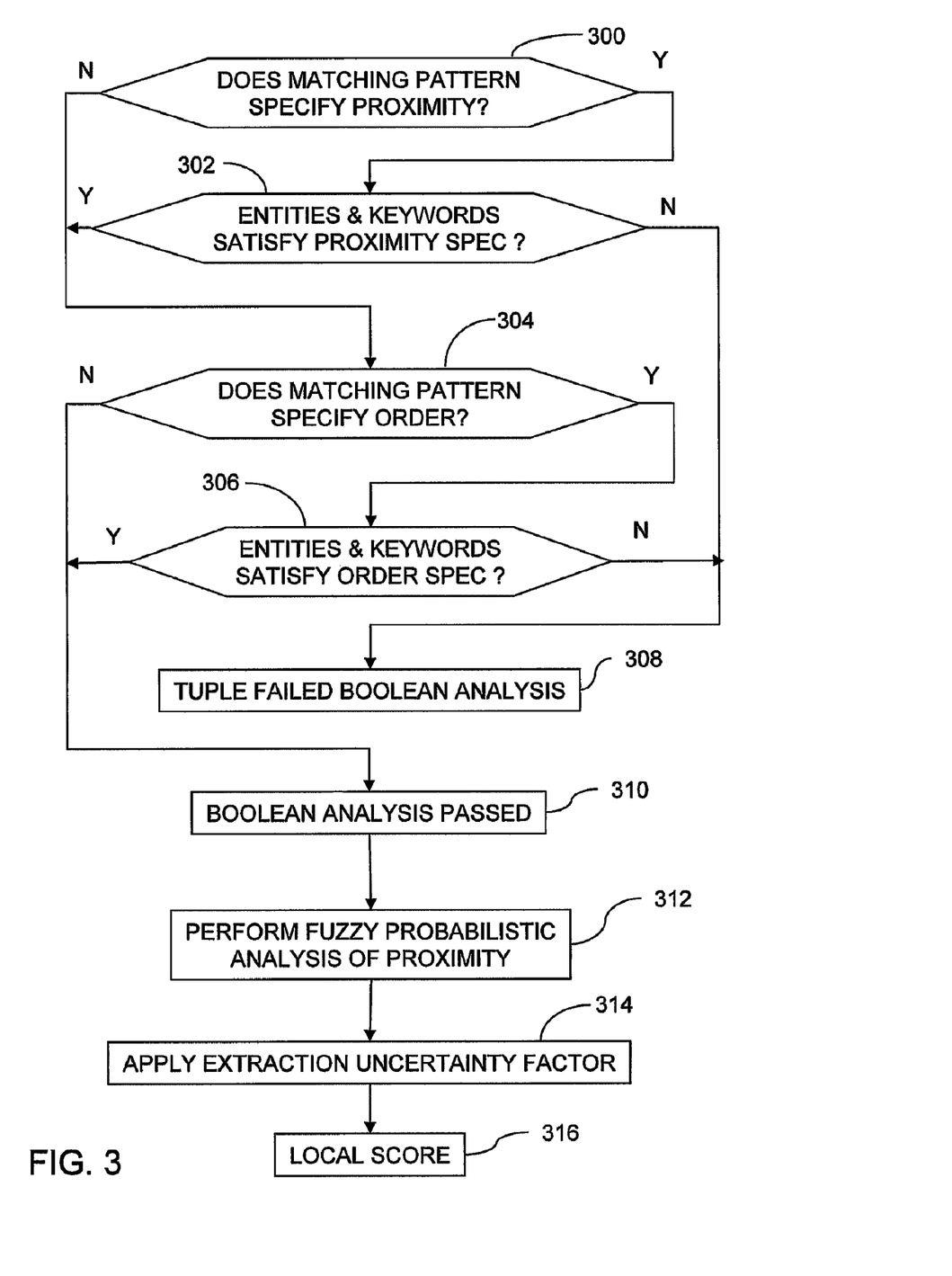
FIG. 3 is a detailed flow chart of a method for providing a local score of an entity tuple.

FIG. 3 is a detailed flow diagram of some of the functions performed in one example of the recognition layer 606. Other alternative recognition layer designs may also be used.

To determine $p_{context}$, this contextual analysis primarily comprises two parts, Boolean pattern analysis and fuzzy proximity analysis. Boolean pattern analysis performs the function of instantiating tuples, after which fuzzy proximity analysis performs the function of estimating in-document association strength of tuples. The Boolean pattern analysis accepts or rejects combinations of objects within a given document as potential candidate tuples for a solution set. The fuzzy proximity analysis allows calculation of a quantitative local score for each potential candidate tuple.

At steps 300-308, the Boolean analysis is performed. For each combination of all of the keywords in the query and entities having all of the entity types in the query, a candidate entity tuple is compared to the matching pattern (if any) included in the query.

At step 300, if the matching pattern includes a proximity specification, then at step 302, the occurrence of the keywords and entities are evaluated. If there is no proximity specification in the matching pattern, then step 304 is performed next.

At step 302, a determination is made whether the entities and keywords in the candidate entity tuple satisfy the proximity specification (i.e., whether all of the keywords and entities for the candidate entity tuple are within the specified proximity to each other). If so, then step 304 is performed next. If the proximity specification is not satisfied, then step 308 is next.

At step 304, if the matching pattern includes an order specification, then at step 306, the order of the keywords and entities are evaluated. If there is no order specification in the matching pattern, then step 308 is next.

At step 306, a determination is made whether the entities and keywords in the candidate entity tuple satisfy the order specification. If so, then step 310 is next. If the order specification is not satisfied, then step 308 is next.

At step 308, the candidate tuple has failed the Boolean analysis. The occurrence of the candidate entity tuple is deemed to not represent a solution to the query. One of ordinary skill will appreciate that there may be other occurrences of the same candidate entity tuple satisfying the Boolean analysis in the same document, or in one or more other documents. The recognition layer 606 evaluates all occurrences of each of the candidate entity tuples in each document indexed in the extracted entity keyword index 608.

At step 310, the candidate entity tuple has satisfied the matching pattern criterion, so the Boolean analysis is passed. Thus, the result of the Boolean analysis is a binary, "true" or "false" value.

At step 312, a second analysis is performed to assign a quantitative value to each occurrence of each candidate entity tuple that satisfies the matching pattern. The recognition layer 606 quantifies, by a probability function, how well the proximity between the objects match the desired tuple, i.e., the degree with which the objects' positions indicate their association as a tuple. In some embodiments, this probability function is provided by a fuzzy probabilistic analysis based on the total span of all of the keywords and entities in the candidate entity tuple. Other probability functions may be used.

At step 314, an extraction uncertainty factor may be applied.

At step 316, the local score for each entity tuple with a document is determined, based on all of the occurrences of the entity tuple within that document.

The functions of the recognition layer described in FIG. 3 are performed for each occurrence of an entity tuple, in each document having such occurrences for that tuple.

Context Matching Operators

Context Operators $\alpha$: The system evaluates $p_{context}(\alpha(\gamma))$, to see how $\gamma$ occurs in a way matching $\alpha$, in terms of the surrounding context. In entity search, a query q specifies a context operator $\alpha$, which suggests how the desired tuple instances may appear in Web pages (or other type of document in the document collection).

One can compare and contrast usage of patterns in entity search herein with its counterparts in document search (e.g., document and web page search engines). Entity search uses textual patterns in a different way—a tuple pattern $\alpha$ describes the possible appearance of the surrounding context of a desired tuple over a plurality of documents and/or pages. In contrast, keyword patterns in document search are intended for the content within an individual desired document.

In the entity view, each entity or keyword occurrence $o_i$ is extracted with its positions at $o_i.pos$. An operator shall match on the order or proximity of objects: Each operator $\alpha$ applies to match an occurrence $\gamma$, i.e., of the form $\alpha(o_1, \ldots, o_m)$. In one embodiment, the available operators are: doc, phrase, uw, ow, as described below. Other embodiments may provide a different suite of context matching operators.

The context matching operator allows users (end users or applications) to specify how the desired tuple may appear in documents. As in any query language, it also involves the trade-off of simplicity (or ease of use) and expressiveness. The exact balance of such a tradeoff depends on the actual application settings—Thus one of ordinary skill in the art will appreciate that a variety of embodiments including method and system implementations in a wide range of settings are contemplated. For example, in some embodiments, the entity search system can be deployed in a general entity search engine for end users. In other embodiments, the system or method is incorporated as a component or linked module of a specialized vertical application. In an integrated vertical application using a system as described herein, variable values used by the vertical application may be provided at execution time by execution of an entity search among documents/pages in a database (such as the Internet, or a subset of the documents on the Internet or other network, or an indexed set of locally stored documents, for example).

Therefore, some embodiments use a two-fold strategy to balance the trade-off, with a set of system built-in operators: On the one hand, for simplicity, while users may specify explicitly an $\alpha$ operator, the system supports a default when the operator is omitted (e.g., the order in which the entities appear in the query, or the order in document query systems). On the other hand, for expressiveness, while an application may choose to use the supported operators, in some embodiments, the system supports a plug-in framework for applications to define their own specific context patterns.

A few non-limiting examples of supported operators are provided below, each in the form of $\alpha(o_1, \ldots, o_m)$. These examples demonstrate how an operator is defined, in order to be plugged into the recognition layer. In these examples, each operator includes two parts (as R-Contextual states), i.e., the pattern constraint $\alpha_B$ and proximity function $\alpha_P$. Thus, the context probability (of Eq. 3) may be defined as $$p_{context}(\alpha(\gamma)) \equiv \alpha_B(o_1, \ldots, o_m) \times \alpha_P(o_1, \ldots, o_m).$$

Boolean Pattern Qualification (steps 300-310 of FIG. 3): As the first step, $\alpha$ will qualify, by a constraint $\alpha_B$ that returns 1 or 0 (true or false), whether some pattern constraint on the order and adjacency of $o_i$ is satisfied. The exemplary operators are doc, phrase, uw, and ow.

doc($o_1, \ldots, o_m$): objects $o_i$ must all occur in the same document.

phrase($o_1, \ldots, o_m$): objects $o_i$ must all occur in exactly the same sequence (i.e., order and adjacency) as specified.

uw(n)($o_1, \ldots, o_m$): objects $o_i$ must all occur in a window of no more than n words; n default as the document length.

ow(n)($o_1, \ldots, o_m$): in addition to uw, $o_i$ must all occur in the order.

Probabilistic Proximity Quantification (step 312, FIG. 3): As the second step, the operator $\alpha$ will quantify, by a probability function $\alpha_P$, how well the proximity between objects match the desired tuple—i.e., how the objects' positions indicate their association as a tuple, once they are qualified (above). Essentially, each operator will thus define a probabilistic distribution that assesses such association probabilities given object positions.

Some embodiments use an intuitive and practical model, the span proximity model, to capture the basic intuition that the closer the keywords and entities appear to each other, the more likely they are associated with each other.

In the span model, the proximity strength of a tuple occurrence $\gamma = (o_1, \ldots, o_m)$ is characterized as depending on its span length—the shortest window that covers the entire occurrence, denoted by s. Thus, in some embodiments, the context association probability of $\gamma$, i.e., how $e_i$ and $k_j$ associate into a tuple, is defined as solely determined by span.

$$\alpha_P(\gamma) \equiv p(\gamma \text{ is a tuple}|s), \text{ or simply } p(\gamma|s).$$

Figure 4:
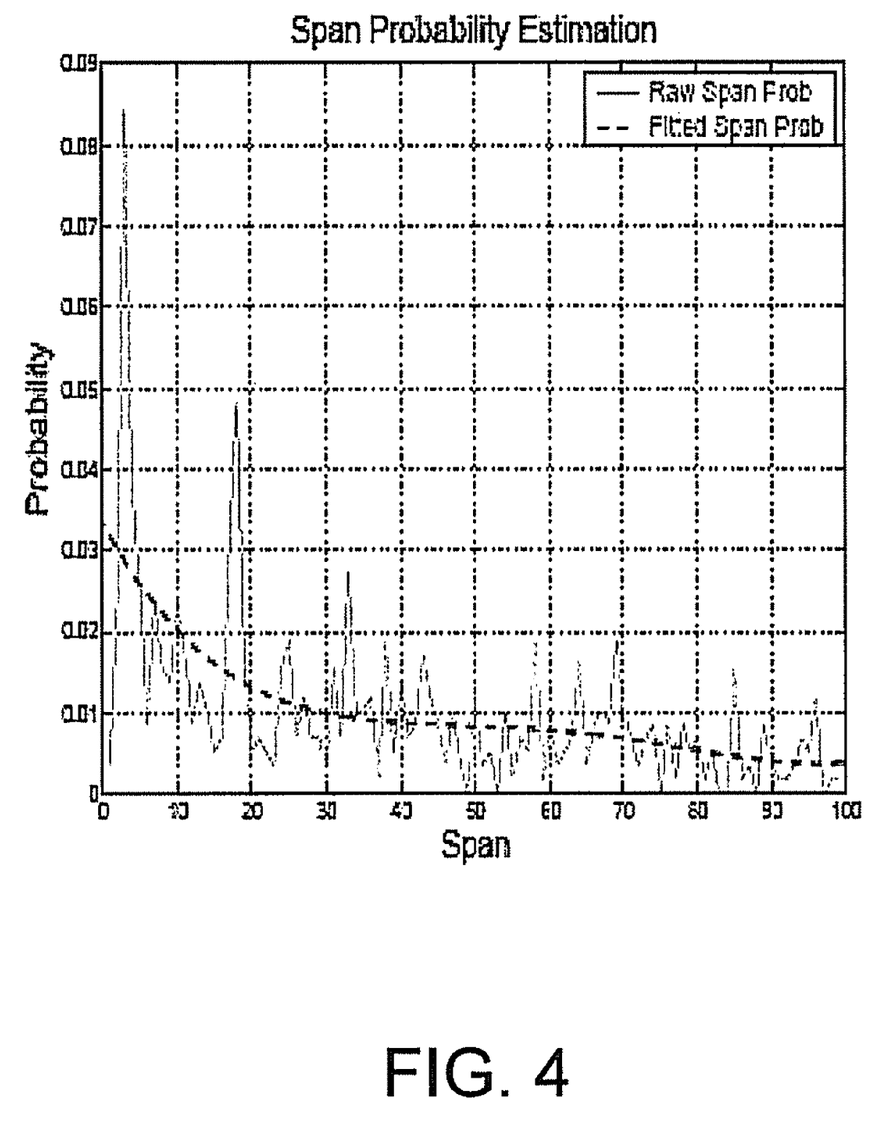
FIG. 4 is a diagram of an example of a span probability distribution function used by the fuzzy probabilistic analysis step of FIG. 3.

The system then estimates the distribution $p(\gamma|s)$. This distribution may be "learned" by collecting some true tuples (as empirical "labelled data")—i.e., $\gamma$'s that are really tuples. With sufficient examples, one can obtain an empirical distribution of, for real tuples, how their spans vary, i.e., $p(s|\gamma)$. FIG. 4 shows an example of a span probability estimation function that may be used. This function was prepared from a set of company names and phone numbers in a Web database, but other distribution functions may be used.

Finally, by Bayes' theorem, $$p(\gamma|s) = \frac{p(\gamma)}{p(s)} p(s|\gamma) \propto p(s|\gamma),$$

where the prior probabilities p(γ) and p(s) are removed: In a typical implementation, as the priors are hard to measure, the model can assume they are the same, for all different γ and s. Thus, these constant priors will not affect ranking of entities.

Based on the above, i.e., Eq. 2, as the overall result of the recognition layer:

$$p(q(t)|d) = \max_{\gamma} \prod_{e_i \in \gamma} e_i \cdot conf \times \alpha_B(\gamma) \times p(s|\gamma) \quad (3)$$

This exemplary system in local recognition is a general framework that can plug-in any pattern and proximity models. The example of basic patterns and the span model is just one reasonable possibility.

Access Layer: Global Aggregation

The access layer 604 defines how the observer selects documents, and is thus responsible for globally aggregating tuple scores across the entire collection. This layer determines p(d)—how likely each document d would be seen by the observer (and thus how d will contribute to the global aggregation). As its objective (by R-Discriminative), this probability should discriminate documents by their "quality" as a source of information. The specific choice of an effective discriminative measure of quality depends on the document collection—what intrinsic structure or extrinsic meta data is available to characterize the desired notion of quality.

Figure 5:
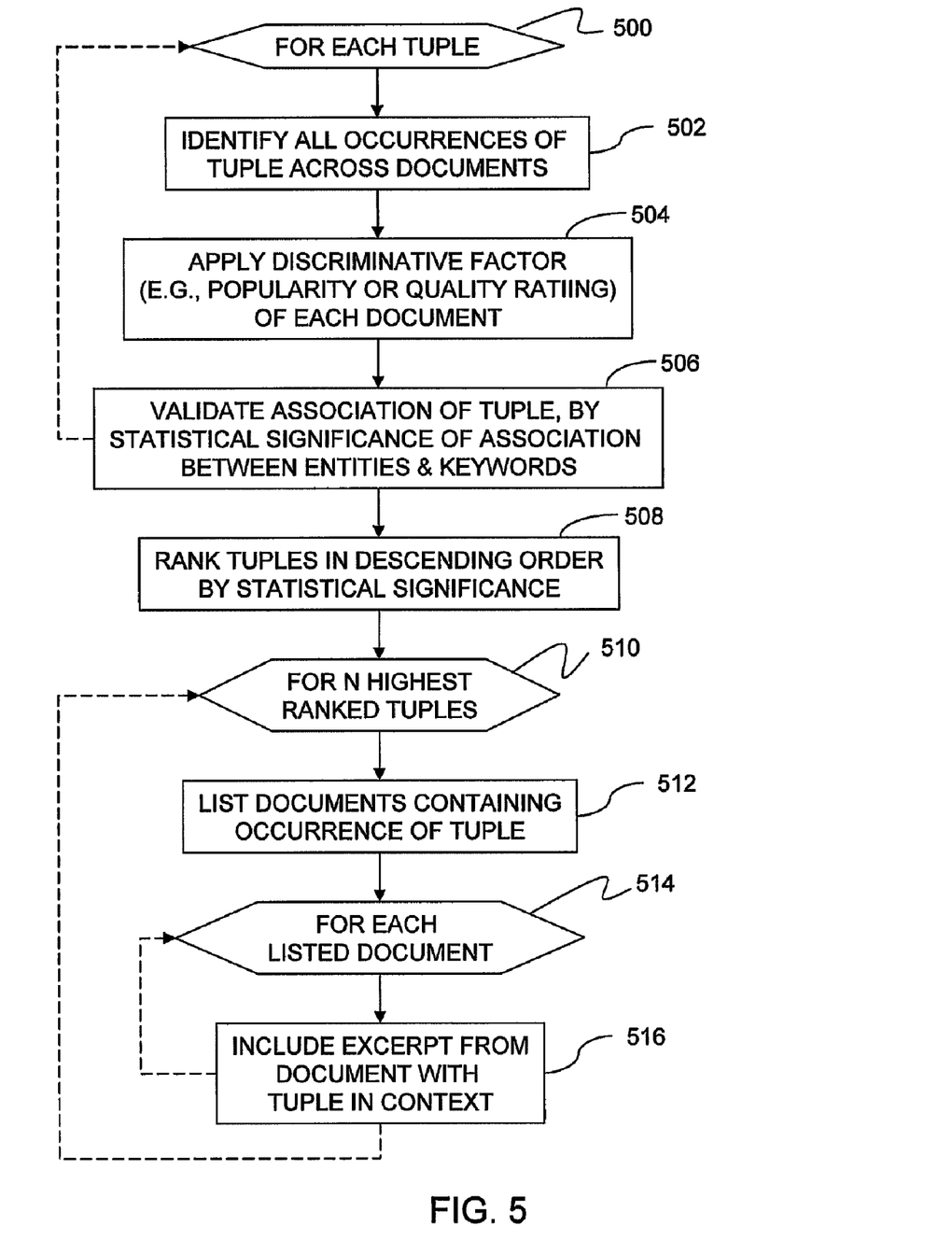
FIG. 5 is a flow chart of the methods performed by the access layer and validation layer.

FIG. 5 is a flow chart summarizing one example of the functions performed by the access layer 604 and the validation layer 602.

At step 500, a loop including steps 502-506 is repeated for each entity tuple that is output from the recognition layer.

At step 502, all occurrences of the entity tuple across all of the documents are identified.

At step 504, at least one discriminative factor is applied. The discriminating factor is a quantitative measure of each document as an information source. Non-limiting examples of such measure include popularity and authoritativeness (page rank or page hit count), quality reviews, freshness, or the like. The discriminative factor weights the local scores of the entity tuple from each document individually. In some embodiments, all of the entity tuples within a given document are assigned a weighting factor particular to that document. In other embodiments, the discriminative factor may be a vector, that recognizes a given document as a high quality source of certain types of information (entity types) but a low quality source of other types of information.

At step 506, the validation layer 602 validates the association of the entities in the tuple with each other and with their keywords by the statistical significance of the association between the entities and the keywords. This validation uses statistical methods to determine that probability that the association between the entities and keywords in the document is not a random occurrence. The output of the validation layer is a normalized set of values for ranking the entity tuples At step 508, the entity tuples are ranked in descending order by statistical significance of association. The output list may be provided to a display, a storage medium, or to a network (for transmission to one or more destination processors).

Steps 510-516 show one example of an output format.

At step 510, a loop is performed for the N highest ranked entity tuples, where N is the number of tuples to be reported in the output.

At step 512, the documents containing at least one occurrence of the entity tuple are listed in association with the entity tuple (e.g., beneath an identification of the tuple). In a linked document database, the documents may be listed by Uniform Resource Indicator (URI). If the document database is the Web, then the URI's are referred to as Uniform Resource Locators (URLs).

At step 514 and 516, for each listed document, and excerpt of the document containing the entity tuple in context is listed in association with the document (e.g., under the URI of the document).

Further details of one example of the access layer 604 and validation layer 602 are provided below.

In the context of the Web, which is only one example of a document database that can be queried by the system, the common notion of popularity may be used as a metric for such quality by the access layer 604. As the Web is a hyperlinked graph, the popularity of a page can be quantified and captured by how often a page is visited by users traversing the graph. Then the access layer is represented by the random walk model, where p(d) is interpreted as the probability of visiting a certain page d in the whole random walk process. With its clear success in capturing page popularity, PageRank is a reasonable choice for calculating p(d) over the Web. That is, computing PR as the PageRank vector, as the overall result of the access layer provides, $$p(d) = PR[d]. \quad (4)$$

As in a typical search engine setting, this page discriminative metric can be computed offline. However, unlike in a typical search engine, PR is not used to directly rank result "objects" by their popularity. Instead, these popularity values are used as a quantitative discriminative measure to distinguish each page as a source of information—For a tuple t, its score will aggregate, by the impression model (Eq. 1), over all the pages $d_i$ in which it occurs, each weighted by this $p(d_i)$ value.

Although in some embodiments, the access layer is implemented with "popularity" or "authoritativeness" (e.g., PageRank) as the quantitative measure of the page as a source of information, there are many other possibilities. Various embodiments of the access layer may achieve source discrimination in a variety of different ways—so that "good" pages are emphasized. First, such discrimination is not limited to link-based popularity—e.g., user or editorial rating, tagging and bookmarking (e.g., on a social bookmarking web site for storing and sharing web bookmarks, such as del.i-cio.us), and query log analysis. Second, such discrimination may even be query-specific and controlled by users—e.g., to focus entity search on a subset of pages. In general, the notion of the global access layer is to capture any or all these different senses of source discrimination, either alone or in any combination with each other.

Validation Layer: Hypothesis Testing

The validation layer statistically validates the significance of the "impression." An exemplary approach compares it with the null hypothesis—simulating an observer over a virtual collection. Although the construction of a random collection D' is conceptual—it yields a formula that can be efficiently computed using a programmed computer or special purpose processor without materializing D'.

As noted above with reference to Eq. 1, p(q(t)|D) is an average impression, i.e., the statistical mean, over D. A probabilistic view, provides principled statistical tools to "validate" whether the impression of association, as the hypothesis to test, is significant. As the null hypothesis, the system may assume that the associations are "unintended"—i.e., as the result of randomly associating entities and keywords in a randomized collection D'. By contrasting observed probability $p_o$ with random probability $p_r$, a final score Score(q(t)) captures the significance of the hypothesis—i.e., intended tuple association.

Null Hypothesis: Randomized Associations. As the null hypothesis, assume that the association of $t=(e_1, \ldots, e_m, k_1, \ldots, k_l)$ is simply accidental—instead of semantically intended as a tuple. To simulate the outcome of the null hypothesis, a database D' is provided as a randomized version of D. In comparison, D' should resemble D as much as possible, except that in D' the associations of keywords and entities are purely random. The creation of a random document d' in D' is as follows:

In this statistical model, one randomly draws entities and keywords into a document d' in D'. Each ei or kj will be drawn independently, with a probability the same as that of appearing in any document of D. This preserves the individual entity/keyword probabilities from D, but randomizes their associations. This probability is derived as below, which ensures that the probability of observing a keyword/entity instance in the process of visiting the D' through a uniform access layer will be the same as observing it in the original D.

$$p(e_i \in d') = \sum_{e_i \in d, d \in D} p(d); \ p(k_j \in d') = \sum_{k_j \in d, d \in D} p(d)$$

Further, if a keyword/entity instance is drawn to appear in virtual document d', its position in the document will also be randomly chosen. This also preserves the entity extraction probability of entity instances, by using the average extraction probability $e_j$.conf (the average over all the extraction probabilities of all the occurrences of entity instance $e_j$ in D) of entity instance $e_j$ as the extraction probability of all the occurrences of entity instance $e_j$ in D'.

Assuming D' includes all such random documents d', the "average impression" that the observer will perceive in this random collection is to be determined. By Eq. 1, this average impression is the summation over all documents. This is simplified by noting that 1) if q(t) does not even appear in d', then p(q(t)|d')=0, 2) otherwise, p(q(t)|d') has the same value—since all d' are provided in exactly the same way. Consequently:

$$p(q(t)|D') = \sum_{d' \in D' \text{ and } q(t) \in d'} p(d') \times p(q(t)|d') \quad (5)$$
$$= p(q(t)|d') \times \sum_{d' \in D' \text{ and } q(t) \in d'} p(d')$$
$$= p(q(t)|d') \times p(q(t) \in d').$$

Here, p(q(t)∈d') is the probability of t appearing in some d'. As keywords and entity instances are drawn independently into d', this probability is the product of the probabilities of each keyword and entity instances appearing in d', i.e., $$p(q(t) \in d') = \prod_{j=1}^{m} p(e_j \in d') \prod_{i=1}^{l} p(k_i \in d')$$

Next, the random association probability, p(q(t)|d'), of tuple t in document d' is determined. It is the product of entity probability and contextual probability:

$$p(q(t)|d') = \left(\prod_{j=1}^{m} \overline{e_j \cdot conf}\right) \times p_{context}(q(t)|d').$$

The contextual probability $p_{context}(q(t)|d')$ is dependent on the span of tuple t. As keywords and entity instances appear randomly in d', the possible spans of tuple t should also appear randomly. This means different span values are equally likely. Thus, the average of all the span probabilities may be used for this probability estimation:

$$p_{context}(q(t)|d') = \overline{p}(q(t)|s) = \frac{\sum_s p(q(t)|s)}{|s|},$$

where |s| refers to the number of distinct span values.

Putting together these derivations back to Eq. 5, provides p(q(t)|D').

Hypothesis Testing: G-Test. To judge if the association of t is statistically significant, compare the observed $p_o$ versus the random $p_r$. A standard statistics test may be used, such as by not limited to mutual information, $\chi 2$, G-test, etc. Some exemplary implementations use a G-test to check whether $p_o$ indicates random association or not, $$\text{Score}(q(t)) = 2\left(p_o \log \frac{p_o}{p_r} + (1-p_o)\log\frac{1-p_o}{1-p_r}\right) \quad (6)$$

The higher the G-test score is, the more likely entity instances t together with keywords k are truly associated. In some embodiments, this score is used for the final ranking of the tuples. In practice, given a large web page collection (or other document collection) containing many keywords and entity instances, the chance that an entity instance occurs in the collection is extremely small. Hence, $p_o, p_r \ll 1$, Eq. (6) can be simplified as:

$$\text{Score}(q(t)) \propto p_o \cdot \log \frac{p_o}{p_r} \quad (7)$$

Figure 8:
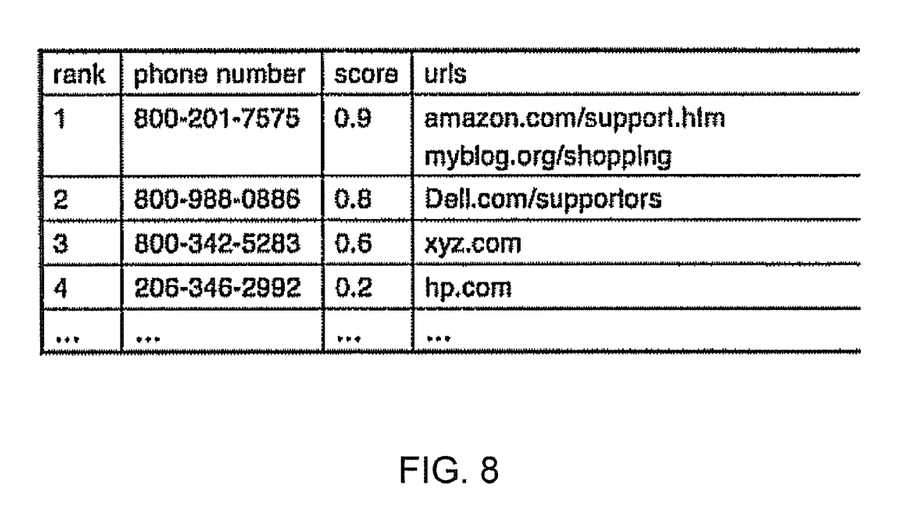
FIG. 8 is a diagram of sample output listing of entity tuples, along with their ranks and the URLs of documents containing them.

FIG. 8 is a diagram of an exemplary output listing for the query Q1 described above (seeking the Amazon Customer Service telephone number). FIG. 8 shows the first four entity tuples (in this case, four 1-dimensional tuples, each comprising a phone number.). Each tuple has a score and a URI listed. In the case of the top ranked tuple, two different documents are cited as containing the keywords Amazon, customer and service and a telephone number entity. These documents are found at amazon.com/support.htm and myblog.org/shopping.

The present invention may be embodied in the form of computer-implemented processes and apparatus for practicing those processes. The present invention may also be embodied in the form of computer program code embodied in tangible machine readable storage media, such as random access memory (RAM), floppy diskettes, read only memories (ROMs), CD-ROMs, hard disk drives, flash memories, or any other machine-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, such that, when the computer program code is loaded into and executed by a computer, the computer becomes an apparatus for practicing the invention. When implemented on a general-purpose processor, the computer program code segments configure the processor to create specific logic circuits. The invention may alternatively be embodied in a digital signal processor formed of application specific integrated circuits for performing a method according to the principles of the invention.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method comprising:
   (a) receiving an input query q including one or more keywords and one or more entity types;
   (b) searching a database D that indexes keywords and instances of entities having entity types in a collection of documents, the searching including searching for documents having the keywords and entities with the entity types in the input query;
   (c) aggregating a respective score $p_o(q(t))$ for each q(t) of a plurality of resultant entity tuples, where t consists of entities of the types in the input query, across the plurality of document d in the database D, where p(d) is a discriminative measure of d and p(q(t)|d) a local score of q(t), as follows:

$$p_o(q(t)) = p(q(t) | D) = \sum_{d \in D} p(d) \cdot p(q(t) | d);$$

(d) normalizing the aggregated scores by statistically validating the significance of said score over the database, each respective normalized score providing a ranking of a respective entity tuple, relative to other entity tuples, as an answer to the input query; and
   (e) outputting a list, including a subset of the entity tuples having the highest normalized scores among the plurality of entity tuples, to a storage or display device or a network.

2. The method of claim 1, further comprising calculating a respective local score for a respective occurrence of a respective one of the entity tuples in each document, wherein the aggregating step for each entity tuple includes combining the respective local scores for that entity tuple from each one of the plurality of documents containing one of the occurrences of that tuple.

3. The method of claim 2, wherein each local score is based in part on a context in which the entity tuple appears in a respective one of the documents.

4. The method of claim 2, wherein each local score is based in part on a factor characterizing an uncertainty associated with extraction of an occurrence of the entity from one of the documents.

5. The method of claim 2, wherein the aggregating step includes assigning a respective discriminative measure to each of the plurality of documents, and weighting each local score based at least in part on the discriminative measure assigned to the document for which that local score is calculated.

6. The method of claim 5, wherein the discriminative measure is based on a quantitative measure indicative of a property of the document as a source of information.

7. The method of claim 6, wherein the discriminative measure is one of the group consisting of document quality, document popularity, document authoritativeness, and document freshness.

8. The method of claim 2, wherein each local score is at least partly based on a Boolean pattern analysis.

9. The method of claim 8, wherein the Boolean pattern analysis is at least partly based on evaluation of the documents against a matching pattern associated with one or more of the entity types, the matching pattern specifying how entities having the entity types and the one or more keywords associated therewith are to appear in relation to each other within one of the documents in order to qualify as an instance of the entity tuple comprised of entities of each of the entity types during the searching step.

10. The method of claim 9, wherein the matching pattern specifies at least one textual relationship.

11. The method of claim 9, wherein the textual relationship includes a proximity relationship, an order relationship, or both.

12. The method of claim 8, wherein the Boolean pattern analysis is at least partly based on a fuzzy probabilistic analysis taking into account a proximity of keywords and entities to each other.

13. The method of claim 1, wherein each respective entity tuple in the output list is accompanied by a listing of a subset of the plurality of documents, from which that entity tuple is identified.

14. The method of claim 13; wherein the listing includes a respective excerpt from each of the subset of the plurality of documents, each respective excerpt including the respective entity that is matched to the input query to identify that entity tuple.

15. The method of claim 13, wherein:
   the plurality of documents are stored in a plurality of computers accessed by way of a network using uniform resource identifiers, and
   for each respective entity tuple, the list includes the respective uniform resource identifiers for each respective document in the subset of the plurality of documents.

16. The method of claim 1, further comprising providing an index of the document database before performing the searching.

17. The method of claim 16, wherein the index includes identification of respective documents in which the entities and keywords are located, and each position of each entity and of each keyword within each of the identified documents having that entity and that keyword.

18. The method of claim 1, wherein the aggregated scores are normalized using global statistics of the document database and relatively ranked with respect to each other.

19. The method of claim 1, wherein the entity tuples in the list are arranged by normalized scores in descending order.

20. A method comprising:
searching for qualifying occurrences of a query q consisting of at least one entity and at least one keyword from a database of linked documents,
identifying entity tuples from the qualifying occurrences of the entity and keyword;
for each instance of entity tuple q(t) in one document d of the documents, assigning a local score p(q(t)|d) based on a context of the entity in that document and an uncertainty value associated with extraction of the entity from that document;
for each distinct entity tuple q(t), aggregating all the local scores thereof into a global score across the documents, based on respective weight p(d) assigned to each respective document d, as follow, $$p_o(q(t)) = p(q(t) \mid D) = \sum_{d \in D} p(d) \cdot p(q(t) \mid d);$$

normalizing the aggregated score by statistically validating the significance of said score over the database; and
outputting a relatively ranked listing of the normalized scores of at least a subset of the distinct entity tuples, to a storage or display device.

21. The method of claim 20, wherein:
the searching includes searching using a matching pattern that specifies a positional relationship between each entity and each keyword within one of the documents; and
the identifying includes collecting a respective entity tuple from each document in which all the specified entities appear together with all the specified keywords in a positional relationship that complies with the matching pattern.

22. The method of claim 20, wherein the local score assigning includes identifying a weighting factor based on an extraction probability of instances of the at least one entity in the entity tuple.

23. The method of claim 20, wherein the local score assigning includes identifying a weighting factor based on how keyword terms and entity instances appear in context in a given document.

24. The method of claim 20, wherein the aggregating local scores includes identifying a weighting factor based on a quantitative indicator of a property of the document as a source of information.

25. The method of claim 20, wherein the quantitative indicator indicates one of the group consisting of popularity of the document where an entity tuple is matched or quality of the document where an entity tuple is matched.

26. The method of claim 20, wherein the relatively ranked listing of the global scores are normalized using global statistics of the document database.

27. The method of claim 26, wherein the ranking of entity tuples is based on said normalized scores, in descending order.

28. A system comprising:
at least one processor,
said at least one processor being coupled to access a document database D that indexes keywords and instances of entities having entity types in a plurality of documents;
said at least one processor being configured to receive an input query q including one or more keywords and one or more entity types, and search the database for documents having the keywords and entities with the entity types of the input query;
said at least one processor configured for aggregating a respective score for each q(t) of a plurality of entity tuples across the plurality of documents d in database D, as follows, based on respective weight p(d) assigned to each respective document d and local score p(q(t)|d), $$p_o(q(t)) = p(q(t) \mid D) = \sum_{d \in D} p(d) \cdot p(q(t) \mid d)$$

said at least one processor configured to normalize the aggregated scores by statistically validating the significance of said score over the database, each respective normalized score providing a ranking of a respective entity tuple, relative to other entity tuples, as an answer to the input query;
said at least one processor having an interface to a storage or display device or network for outputting a list including a subset of the entity tuples having the highest normalized scores among the plurality of entity tuples.

29. The system of claim 28, wherein the processor calculates a respective local score for a respective occurrence of a respective one of the entity tuples in each document, wherein the aggregated score for each entity tuple is based on a combination of the respective local scores for that entity tuple from each one of the plurality of documents containing one of the occurrences of that tuple.

30. The system of claim 29, wherein each local score is at least partly based on at least one of the group consisting of:
a context in which the entity tuple appears in a respective one of the documents,
a factor characterizing an uncertainty associated with extraction of an occurrence of the one or more entities from one of the documents,
a Boolean pattern analysis taking into account a proximity of keywords and entities to each other, an order of keywords and entities relative to each other, or both, and
a fuzzy probabilistic analysis talking into account a proximity of keywords and entities to each other.

31. The system of claim 29, wherein the aggregating step includes assigning a respective discriminative measure to each of the plurality of documents, and weighting each local score based at least in part on the discriminative measure assigned to the document for which that local score is calculated, wherein the discriminative measure is based on an objective measure of the document as a source of information.

32. The system of claim 31, wherein the discriminative measure is one of the group consisting of document quality, document popularity, document authoritativeness, and document freshness.

33. The system of claim 28, wherein one or more of the entity types is associated with a matching pattern, which specifies how entities having the one or more entity types and the one or more keywords associated therewith are to appear in relation to each other within one of the documents in order to qualify as an instance of the entity tuple comprised of entities of each of the entity types during the searching step.

34. The system of claim 28, wherein each respective entity tuple in the output list is accompanied by a listing of a subset of the plurality of documents, from which that entity tuple is identified.

35. The system of claim 34; wherein the listing includes a respective excerpt from each of the subset of the plurality of documents, each respective excerpt including the respective entity that is matched to the input query to identify that entity tuple.

36. The system of claim 28, wherein:
the processor is communicatively coupled with a network,
the plurality of documents are stored in a plurality of computers accessed by way of the network using uniform resource identifiers, and
for each respective entity tuple, the list includes the respective uniform resource identifiers for each respective document in the subset of the plurality of documents.

37. The system of claim 28, wherein the aggregated scores are normalized using global statistics of the document database and relatively ranked with respect to each other.

38. A machine readable storage medium encoded with computer program code, wherein when the computer program code is executed by a processor, the processor performs a method comprising:
(a) receiving an input query q including one or more keywords and one or more entity types;
(b) searching a database D that indexes keywords and instances of entities having entity types in a collection of documents, the searching including searching for documents having the keywords and entities with the entity types in the input query
(c) aggregating a respective score $p_o(q(t))$ for each q(t) of a plurality of resultant entity tuples, where t consists of entities of the types in the input query, across the plurality of documents d in the database D, where p(d) is a discriminative measure of d and p(q(t)|d) a local score of q(t), as follows:

$$p_o(q(t)) = p(q(t) \mid D) = \sum_{d \in D} p(d) \cdot p(q(t) \mid d);$$

(d) normalizing the aggregated scores by statistically validating the significance of said score over the database, each respective normalized score providing a ranking of a respective entity tuple, relative to other entity tuples, as an answer to the input query; and
(e) outputting a list, including a subset of the entity tuples having the highest normalized scores among the plurality of entity tuples, to a storage or display device or a network.

39. The machine readable storage medium of claim 38, wherein the processor calculates a respective local score for a respective occurrence of a respective one of the entity tuples in each document, and the aggregated score for each entity tuple is based on a combination of the respective local scores for that entity tuple from each one of the plurality of documents containing one of the occurrences of that tuple.

40. The machine readable storage medium of claim 39, wherein each local score is at least partly based on at least one of the group consisting of:
a context in which the entity tuple appears in a respective one of the documents,
a factor characterizing an uncertainty associated with extraction of an occurrence of the one or more entities from one of the documents,
a Boolean pattern analysis taking into account a proximity of keywords and entities to each other, an order of keywords and entities relative to each other, or both, and
a fuzzy probabilistic analysis taking into account a proximity of keywords and entities to each other.

41. The machine readable storage medium of claim 39, wherein the aggregating step includes assigning a respective discriminative measure to each of the plurality of documents, and weighting each local score based at least in part on the discriminative measure assigned to the document for which that local score is calculated, wherein the discriminative measure is based on an objective measure of the document as a source of information.

42. The machine readable storage medium of claim 41, wherein the discriminative measure is one of the group consisting of document quality, document popularity, document authoritativeness, and document freshness.

43. The machine readable storage medium of claim 38, wherein one or more of the entity types is associated with a matching pattern, which specifies how entities having the one or more entity types and the one or more keywords associated therewith are to appear in relation to each other within one of the documents in order to qualify as an instance of the entity tuple comprised of entities of each of the entity types during the searching step.

44. The machine readable storage medium of claim 38, wherein each respective entity tuple in the output list is accompanied by a listing of a subset of the plurality of documents, from which that entity tuple is identified.

45. The machine readable storage medium of claim 44; wherein the listing includes a respective excerpt from each of the subset of the plurality of documents, each respective excerpt including the respective entity that is matched to the input query to identify that entity tuple.

46. The machine readable storage medium of claim 38, wherein:
the processor is communicatively coupled with a network,
the plurality of documents are stored in a plurality of computers accessed by way of the network using uniform resource identifiers, and
for each respective entity tuple, the list includes the respective uniform resource identifiers for each respective document in the subset of the plurality of documents.

47. The machine readable storage medium of claim 38, wherein the aggregated scores are normalized using global statistics of the document database and relatively ranked with respect to each other.

* * * * *